May 20, 1924. 1,494,704
C. G. PETREE
APPARATUS FOR SEPARATING FLOATING AND OTHER IMPURITIES
IN SUSPENSION FROM LIQUIDS
Filed June 28, 1920 2 Sheets-Sheet 1

INVENTOR
Cuthbert G Petree
by W H Babcock & Son
Attorneys

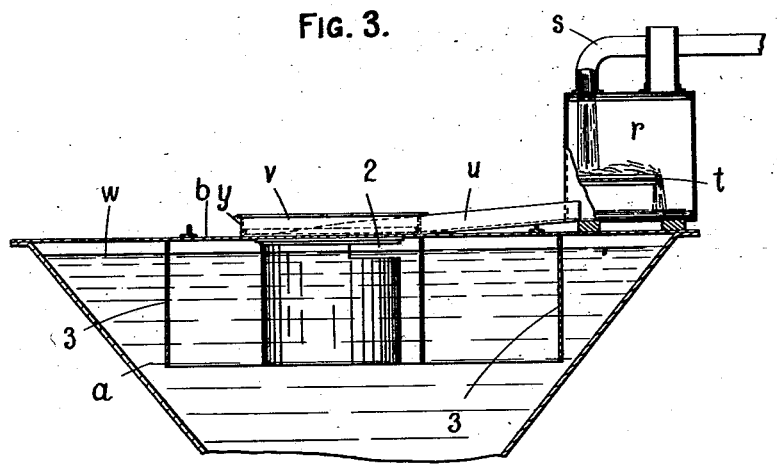

Patented May 20, 1924.

1,494,704

UNITED STATES PATENT OFFICE.

CUTHBERT GEORGE PETREE, OF BRISBANE, AUSTRALIA.

APPARATUS FOR SEPARATING FLOATING AND OTHER IMPURITIES IN SUSPENSION FROM LIQUIDS.

Application filed June 28, 1920. Serial No. 392,401.

*To all whom it may concern:*

Be it known that I, CUTHBERT GEORGE PETREE, a subject of the King of England, residing at Brisbane, Australia, have invented certain new and useful Improvements in and Relating to Apparatus for Separating Floating and Other Impurities in Suspension from Liquids, of which the following is a specification.

This invention relates to apparatus of the kind employed to separate the scum and sediment from liquids such as the juice from sugar cane, which, as is well-known, is defecated by the addition of lime and the application of heat, which causes the impurities to separate in the form of scum and sediment.

The present invention has for its object to provide improved apparatus whereby the process of separation is both automatic and continuous and enables larger quantities of liquids than heretofore to be dealt with in a satisfactory, economical and efficient manner, and comprises a conical vessel in which the impurities are separated; means hereinafter described whereby the liquid to be treated is fed into said conical vessel in such a manner as not to disturb the liquid already undergoing treatment within it—including a receiving chamber and a circular distributing chamber into which the liquid to be treated is introduced tangentially, a central opening surrounded by a gallery within said distributing chamber and a throat surrounded by a volute path; an inverted weir to automatically collect and deliver the scum at one point; a scum removing device; an overflow at another point where the clear liquor is automatically drawn off; and helical or other scrapers adapted to be rotated slowly in contact with the interior walls of the vessel so as to cause the precipitate deposited upon them to descend regularly to the delivery outlet at the apex of the cone at the bottom of the vessel. In some cases the receiving chamber and scum removing device may be dispensed with.

According to one mode of carrying my invention into practice I employ an inverted conical vessel having three outlets:—one for precipitated impurities situated at the apex of the cone at the bottom of the vessel and an overflow for the clarified liquid at the periphery of the vessel at or near the top thereof where the clarified liquid is delivered after passing beneath an inverted weir or scum deflector by which the floating impurities are collected and subsequently removed by hand or automatically diverted through a third suitable outlet also situated at the periphery of the vessel but at a higher level. The aforesaid weir is situated at a sufficient distance from the outlet for the clarified liquid to give time for any rafts of impurities at or brought to the surface by occluded air or gases to sink again upon the releases of such air or gas or other buoying agency before reaching said outlet for the clarified liquid.

The top of this vessel, which corresponds with the base of the cone, is covered in and supports a platform provided with a bearing in which a vertical shaft co-axial with the cone is adapted to rotate. This shaft is provided with arms carrying scrapers hereinafter described, has a lower bearing within the vessel and is driven by suitable gearing at its upper end. The cover of this vessel is provided with an opening which is surrounded by a concentric circular distributing chamber of larger diameter mounted upon said cover from which also depends a cylindrical throat that surrounds the aforesaid central opening and extends beneath the surface of the liquid within the conical vessel. This throat is provided with an opening at or near its upper end and is surrounded by a volute wall or baffle plate which also depends from the aforesaid cover and extends between said throat and the walls of the conical vessel. This volute wall also extends a short distance beneath the surface of the liquid in a conical vessel and forms a volute path of increasing width for the liquid that passes through the opening in the walls of the throat within which path the velocity of said liquid is reduced as the volute channel widens so as to enable any heavy particles carried in partial suspension to be more readily precipitated to the lower part of the vessel.

When the supply of the liquid to be treated is intermittent or disturbed as it might be if delivered by pulsating pumps, it may at first be received in a separate receiving chamber provided with baffle plates to neutralize or absorb any momentum the liquid may have acquired before its delivery so as to avoid its disturbing the liquid undergoing treatment in the conical subsiding vessel. The liquid then flows through a suitably inclined trough or channel to the walls of the circular distributing chamber first hereinbefore described which it enters at a tangent and delivers the said liquid on to the gallery formed between its walls and the central opening around which it is carried by any momentum it possesses which causes it to heap up against the aforesaid walls until its centrifugal force is overcome by gravity causing it to flow through the central opening into the conical vessel beneath, which it enters through the aforesaid throat that extends beneath the surface of the liquid that is already in it in such a manner as to disturb that portion situated near the surface as little as possible. The greater part of the liquid entering the throat however passes out through the opening at its upper end into the volute path (in which it expends its energy) in the manner hereinbefore explained until it approaches the periphery of the conical vessel near the end of its course where it comes in contact with an inclined plate or weir which extends a short distance above and beneath its surface so as to arrest any scum or floating matter which is caused to travel along the incline of such plate towards the outlet situated at the periphery of the vessel. The clear liquid passes beneath this inverted weir to the end of the volute path where it passes over an overflow and is conducted to the evaporating and concentrating plant or other apparatus employed in carrying out the manufacturing process for further treatment.

The conical vessel is provided with scrapers which are slowly rotated in contact with its interior walls at that part which lies beneath the aforesaid volute path and preferably in the same direction and at a suitable speed which may be substantially the same as that of the fluid passing through it but will depend upon the quantity and nature of the precipitate. These scrapers are as hereinbefore stated, supported by arms mounted on the aforesaid central shaft which may be driven by worm or other suitable gearing.

I will now proceed to more particularly describe my invention with the aid of the accompanying drawings in which:—

Fig. 3 is a part sectional elevation taken on the line C—D in Fig. 1.

Figure 1:
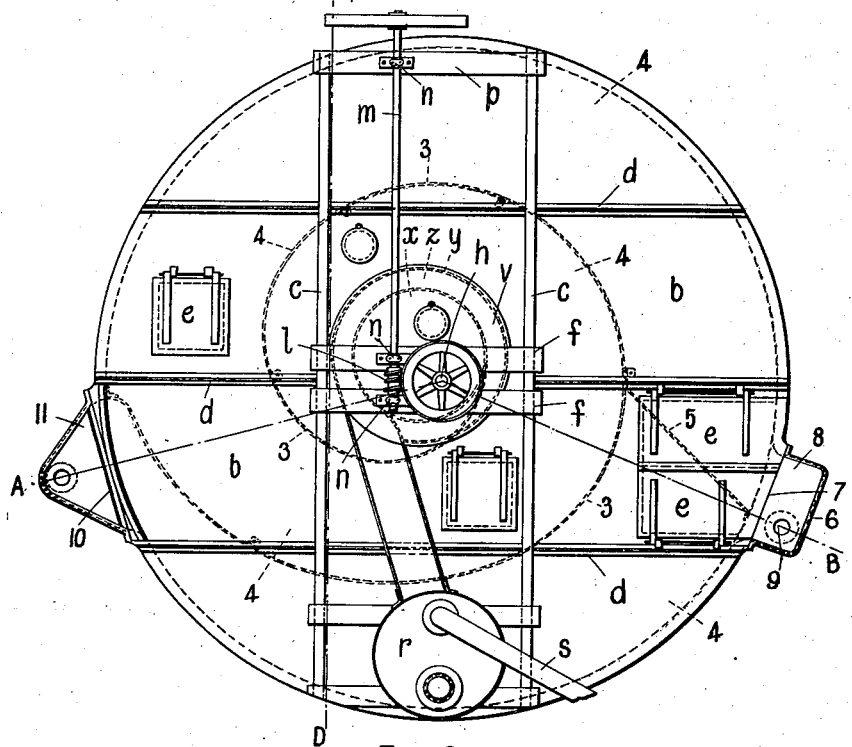
Fig. 1 is a plan view of a preferred construction of the improved apparatus for separating floating and precipitated impurities from liquids.
Figure 2:
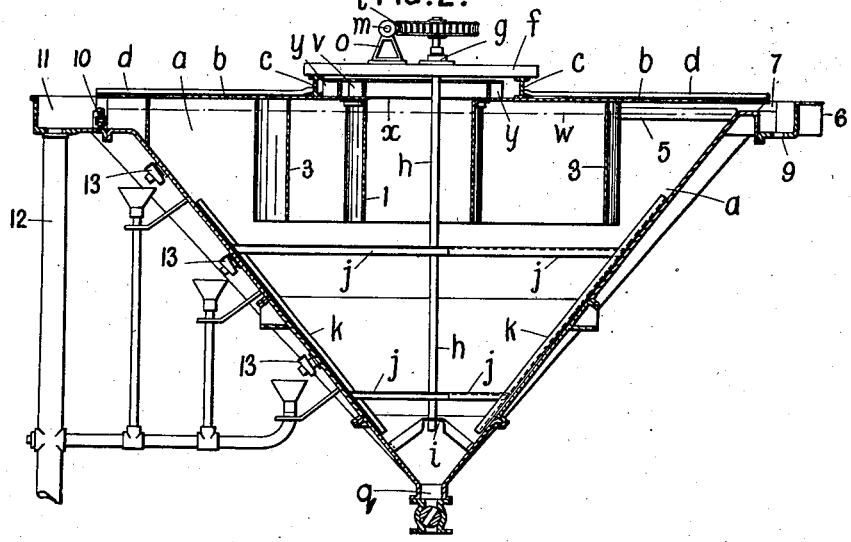
Fig. 2 is a vertical section taken on the irregular line A—B in Fig. 1.

According to the construction shown in the drawings $a$ is a settling vessel having the form of an inverted cone which may be supported by girders (not shown) or in any other suitable well-known manner.

The vessel $a$ is provided with a cover $b$ which is stiffened by the girders $c$, $d$, and has inspection doors $e$.

Cross-beams $f$ mounted on the girders $c$ support a bearing $g$ for the vertical shaft $h$ situated on the axis of the conical vessel $a$. A second bearing or steadying ring $i$ for the shaft $h$ is provided at its lower end within the vessel $a$. This shaft has arms $j$ that carry the scrapers $k$ at their extremities and is rotated slowly by worm gearing $l$ driven by the shaft $m$ journalled in bearings $n$ supported by the standards $o$ mounted on the cross beams $f$, $p$. The scrapers $k$ are thus moved in contact with the interior walls of the vessel $a$ and so cause the sediment deposited upon them to descend regularly to the outlet $q$ at the bottom of the vessel which is controlled by a valve of suitable known construction which may be adjusted so as to continuously draw off the sediment deposited. Or, it may be mechanically operated so as to draw off the accumulated deposit at predetermined intervals. The impure liquid to be treated may enter the apparatus by way of the tangential channel $u$ direct, or be first introduced into the receiving chamber $r$ (Figs. 1 and 3) by the pipe $s$ that delivers it on to a platform $t$ situated near the bottom of the chamber which by absorbing the momentum due to its fall deprives the liquid of its velocity. The liquid then falls from the platform $t$ to the bottom of the chamber $r$ whence it flows through the said channel $u$, which may be slightly inclined, towards the distributing chamber $v$ supported by the cover $b$ of the vessel $a$ near the surface $w$ of the liquid within it. The cover $b$ has a circular opening $x$ that is surrounded concentrically by the circular walls $y$ of the distributing chamber $v$ which is of larger diameter so as to leave a gallery $z$ around the opening $x$.

From the under side of the said cover $b$ a cylindrical throat 1 depends and extends a short distance beneath the surface $w$ of the liquid in the vessel. This throat 1 has an opening 2 near its upper end, through which some of the liquid fed into it flows to the surrounding liquid into which extends the volute wall 3 which is attached to the underside of the cover.

The liquid passing through the opening 2 is thus constrained to flow along a volute path 4 of considerable length wherein its velocity is gradually reduced as the width of that path increases.

When the liquid to be treated contains an appreciable proportion of floating impurities or scum a narrow adjustable plate or inverted weir 5 that extends above and beneath the surface of the liquid, is situated a suitable distance from the end of the aforesaid volute path which it crosses obliquely so as to collect the scum or floating particles for removal to the scum outlet 6 situated at the periphery of the vessel where it can be delivered over the edge 7 into the sink 8 whence it enters the pipe 9 that conveys it away to the desired point.

The clarified liquid that passes beneath the inverted weir 5 flows on to the end of the volute path 4 where it overflows the edge 10 which may be adjustable and enters sink 11 whence it is led away by the pipe 12.

Drawing off taps 13 are provided at different levels to enable the more clarified liquid near the surface to be drawn off first, when it is desired to empty the vessel $a$. The remaining portions of the liquid can afterwards be drawn off successively through the taps 13 as the impurities are deposited at the bottom of the vessel.

In some cases the weir 5 may be curved and the scum prevented from accumulating behind it by blades mounted on a shaft (not shown) driven continuously or intermittently by suitable gearing in the direction to remove said scum up an incline to the outlet 6.

Instead of mounting the blades on a shaft they may be attached to one or more endless belts or chains mounted on rollers adapted to draw them up the aforesaid incline so as to remove any scum that may have collected. Or instead of either of the foregoing arrangements a helical conveyor may be arranged to operate along the line where the surface of the liquid in the conical vessel is intersected by a straight weir.

I claim:

1. An improved apparatus for separating floating and other impurities in suspension from liquids, comprising a settling vessel having a cover and means for continuously feeding to the same without disturbing the liquid undergoing treatment therein consisting of a circular distributing chamber carried upon the cover of said settling vessel there being a circular opening in said cover arranged concentrically with said distributing chamber but of smaller diameter, a gallery formed between the edges of said opening and the walls of the said distributing chamber and a channel to deliver the incoming liquid tangentially upon the aforesaid gallery around which it is carried by its momentum until overcome by gravity and caused to flow inwardly over the circular edge of the central opening into the aforesaid settling vessel substantially as described in the specification.

2. An improved apparatus for separating floating and other impurities in suspension from liquids comprising a conical settling vessel, a cover to said settling vessel situated near the surface of the liquid undergoing treatment therein, a circular opening in said cover, a concentric circular distributing chamber of larger diameter surrounding said opening and supported on the upper side of said cover; a cylindrical throat also concentric with said opening and extending from the underside of said cover a short distance beneath the surface of the liquid within the settling vessel, an opening in said throat at the level of the surface of said liquid, a volute wall extending from the underside of said cover to a short distance beneath said surface and horizontally between the walls of said throat and the settling vessel so as to provide a volute path of substantial length and increasing width for the liquid at the surface to flow through to an overflow for the clear liquid at the end of said volute path and a deflector to prevent any scum reaching said overflow substantially as described and for the purpose set forth in the specification.

In testimony whereof I have signed my name to this specification in the presence of two subscribing witnesses.

CUTHBERT GEORGE PETREE.

Witnesses:
FORENCE ROSE SMITH,
EDGAR A. GODDIN.